United States Patent [19]
Christl et al.

[11] Patent Number: 5,780,939
[45] Date of Patent: Jul. 14, 1998

[54] METHOD AND APPARATUS FOR DETERMINING ORDERS OF NON-CHARACTERISTIC HARMONIC CURRENTS, AND FOR COMPENSATION OF THE NONCHARACTERISTIC HARMONIC CURRENTS

[75] Inventors: Norbert Christl, Herzogenaurach; Peter Lützelberger, Nürnberg; Kadry Sadek, Erlangen, all of Germany

[73] Assignee: Siemens Aktiengesellschaft, Munich, Germany

[21] Appl. No.: 446,654

[22] PCT Filed: Dec. 10, 1992

[86] PCT No.: PCT/DE92/01063

§ 371 Date: May 26, 1995

§ 102(e) Date: May 26, 1995

[87] PCT Pub. No.: WO94/14220

PCT Pub. Date: Jun. 23, 1994

[51] Int. Cl.$^6$ .................................................. H02J 1/02
[52] U.S. Cl. ........................... 307/105; 307/76; 363/39; 363/40; 363/44; 333/179
[58] Field of Search ................................. 307/72, 73, 74, 307/75, 76, 84, 105; 331/176; 333/177, 179; 363/39, 40, 44; 364/480, 492; 323/205, 210, 206, 105; 318/611, 629

[56] References Cited

U.S. PATENT DOCUMENTS

| | | | |
|---|---|---|---|
| 3,949,291 | 4/1976 | Kanngiesser | 323/105 |
| 4,639,846 | 1/1987 | Dahler | 363/39 |
| 4,680,531 | 7/1987 | Rey | 323/206 |
| 4,891,570 | 1/1990 | Nakamura | 323/210 |
| 5,235,503 | 8/1993 | Stemmler | 307/105 |

FOREIGN PATENT DOCUMENTS 0 212 172  3/1987  European Pat. Off. .

OTHER PUBLICATIONS

Elektrie, vol. 46, No. 3, Mar. 1992, Berlin, DE, pp. 114–121; Gretsch et al.: *Einsatz eines Oberschwingungs-Meßgerätes an einer HGÜ-Kurzkupplung.*

IEEE/CSEE Joint Conference on High-Voltage Transmission Systems in China, 17 Oct. 1987, Beijing, China, pp. 148–153, Christl et al.: *Double Tuned Harmonic AC-Filters For HVDC-Converter Stations.*

Elektrie, vol. 45, No. 3, (1991), Berlin, DE, pp. 97–100; Bauer et al.: *Harmonische in Drehstromnetzen bei Betrieb einer HGÜ-Kurzkupplung.* etz. vol. 110 (1989), No. 14, pp. 712–714; R. Gampenrieder et al.: *HGÜ-Brückenschlag Zwischen Bayern und der Tschechoslowakei.*

Elektrie, vol. 45, No. 3, (1991), Berlin, DE, pp. 94–96; R. Walz et al.: *HGÜ: Technik, die Grenzen überwindet.*

*Primary Examiner*—William M. Shoop, Jr.
*Assistant Examiner*—Peter Ganjian
*Attorney, Agent, or Firm*—Kenyon & Kenyon

[57] ABSTRACT

A method and an apparatus can determine the orders (z) of non-characteristic harmonic currents (Ih) of a second power supply grid, which is coupled to a first power supply grid using an HVDCT system. The apparatus and method also compensates for these non-characteristic harmonic currents (Ih), which are produced as a result of distortion (Uh) of the supply voltage (U1) which exists in the first grid because of a low-frequency harmonic and passes through the short coupling. The order (n) of the existing non-characteristic harmonics is determined by a voltage and/or current measurement of the voltage (U1) of the grid, from which order (n) the order (z) of the generated non-characteristic harmonics in the second grid is determined by a provided voltage-symmetry signal (SMG). This order (z) is supplied to filter logic of a compensation system. The energy quality is thus considerably improved, particularly in the case of grids which are not rigid.

9 Claims, 2 Drawing Sheets

METHOD AND APPARATUS FOR DETERMINING ORDERS OF NON-CHARACTERISTIC HARMONIC CURRENTS, AND FOR COMPENSATION OF THE NONCHARACTERISTIC HARMONIC CURRENTS

BACKGROUND OF THE INVENTION

The present invention relates to a method and an apparatus for determining orders of non-characteristic harmonic currents of a second power supply grid, which is coupled to a first power supply grid by means of a high-voltage DC transmission system, and for compensating for these non-characteristic harmonic currents, which are produced as a result of distortion of the supply voltage, which distortion exists in the first power supply grid because of a low-frequency harmonic and passes through the system.

High-voltage DC transmission short couplings are used in order to exchange electrical power between interconnected grids, as a result of which the supply reliability in the individual interconnected grids is improved. In addition, a high-voltage DC transmission (HVDCT) short coupling, also known as a DC grid coupling, permits important and cost-effective power transactions, using normal exchange methods, and has at least a delaying influence on the construction of necessary additional power-station power.

The outline circuit diagram of the Etzenricht DC grid coupling is disclosed in the magazine "etz", Volume 110 (1989), Issue 14, pages 712 to 714. This Etzenricht DC grid coupling connects the West European interconnected grid to the East European interconnected grid. The two grid unions admittedly use the same rated frequency of 50 Hz, but the frequency and voltage in the two grids are at the same time regulated on the basis of different concepts, so that a defined transmission power can be achieved only by decoupling in frequency terms.

The article "HGÜ: Technik, die Grenzen überwindet" [HVDCT: Technology which crosses frontiers] by R. Walz and J. Görke, printed in the magazine "Elektrie", Berlin 45 (1991) 3, pages 94 to 96 contains more details of the method of operation and construction, instrumentation and control techniques, control, regulation and protection and alarm systems. The three-phase filter circuits which are arranged on the busbars of the grids absorb (characteristic) harmonics produced by the converters and produce the capacitive reactive volt-amperes which are required to compensate for the inductive converter reactive volt-amperes. The filter circuits are connected and disconnected by the controller as a function of the reactive volt-ampere balance in the grid and of the operating point of the HVDCT.

With the increasing reference to energy quality, attention is increasingly being paid in electrical power supply grids to reducing harmonics, since the occurrence of harmonics can reduce the electrical energy quality.

As a result of asymmetries in equipment impedances, the grid voltage and the asymmetry of the delay angles of the rectifiers and invertors in the HVDCT system, non-characteristic harmonics occur in addition to the characteristic converter harmonics.

The article "Harmonische in Drehstromnetzen bei Betrieb einer HGÜ-Kupplung" [Harmonics in three-phase grids when an HVDCT coupling is being used], by E. Bauer and G. Winkler, "Elektrie", Berlin 45 (1991) 3, pages 97 to 100, discloses that the amplitudes of the individual non-characteristic current harmonics are considerably smaller than those of the characteristic current harmonics. When designing HVDCT systems, particular attention must be paid to the magnitude of the non-characteristic harmonics which are below the lowest tuning frequency of the filters, since the filters act capacitively for these harmonics and form a tuned circuit with the grid impedance. If this tuned circuit has a parallel resonance point in the region of the non-characteristic harmonics, it is excited by the resonance point and unexpectedly high voltage harmonics can occur in the grid. According to this article, a filter should also be provided for these very low harmonics in the event of excitation, which filter is expediently tuned to the lowest, non-characteristic (i.e., the third) harmonic.

In addition to the non-characteristic harmonics which are produced by asymmetries, the power supply grid has low-frequency, non-characteristic harmonics, such as the 3rd, 5th, 7th, and 9th etc., which are caused by industrial loads, for example converter drives, and small loads, for example television sets. While the characteristic voltage-harmonics depend mainly on the HVDCT power, the non-characteristic voltage harmonics have a pronounced response behavior throughout the day, as is known from low-voltage grids. The load-dependent harmonic emission is relatively low during the night time, and the level of the 5th harmonic, for example, reaches only 1%. During working hours, the level is governed mainly by industrial loads and now reaches up to 1.5%. In contrast, the level in the evenings, when television is being watched, rises to 2.3%—and this in the very-high voltage grid. These non-characteristic harmonics pass through the HVDCT system from one grid to the other grid, as a result of which the electrical energy quality can be considerably reduced.

SUMMARY OF THE INVENTION

The present invention relates to a method and an apparatus for a system as stated initially, which allow the passage and the production of current harmonics, which are caused by harmonics already existing in the first grid or by grid asymmetries, of a converter to be determined and to be compensated for in the second grid.

A first device such as a harmonic measuring circuit determines an order of initial distortion of the voltage of the first power supply grid based on a voltage or a current measurement. A second device such as a memory with downstream-connected logic which is connected downstream of the first device determines an order of a lowest non-characteristic harmonic on a second three-phase side of the system as a function of the determined order of a provided voltage symmetry signal. A compensation system including, for example, a plurality of filters having different low-frequency orders, compensates the non-characteristic harmonic currents in the second power supply grid. A control input of the compensation system is connected to the output of the second device and outputs of the compensation system are connectable to the second power supply grid.

The present invention is in this case based on the knowledge that non-characteristic harmonics of different order are transmitted into the second grid, depending on whether the initial distortion caused in the first power supply grid occurs as a positive-phase-sequence or as a negative-phase-sequence system. It has been found that the non-characteristic harmonics in the first grid and the non-characteristic harmonics which are produced in the second power supply grid are subject to a specific rule. For something to be done against the non-characteristic harmonics which are produced in the second power supply grid, their orders must first be determined.

As a result of the method and apparatus according to the present invention, the possibility now exists of determining the orders of the non-characteristic harmonics in the second power supply grid by means of a voltage and/or current measurement in the first power supply grid. In this case, the order of the low-frequency harmonics existing in the first grid is determined first and, with their aid and that of a voltage symmetry signal which is provided, the order of the lowest non-characteristic harmonics on the DC side of the converter or of an HVDCT system is determined. This harmonic, which is superimposed on the DC, in turn produces non-characteristic harmonic currents on the second three-phase side of the converter, whose orders are determined as a function of the order of the harmonics on the DC side of the converter and of the voltage symmetry signal. Once the orders of the non-characteristic harmonics, which are produced because of a low-frequency harmonic existing in the first power supply grid, in the second power supply grid are determined, parts of a compensation system for non-characteristic harmonics can be activated as a function of these orders.

It is thus possible to compensate objectively for non-characteristic harmonics produced in the second power supply grid, as a result of which the energy quality of the coupled grid is considerably improved, particularly in the case of grids which are not very rigid.

A particularly advantageous apparatus for carrying out the method and apparatus according to the present invention comprises a microprocessor device and a compensation system for non-characteristic harmonics, having associated filter logic. This makes it possible to integrate the microprocessor device into the converter controller.

BRIEF DESCRIPTION OF THE DRAWINGS

In order to explain the present invention further, reference is made to the drawings, which schematically illustrate an exemplary embodiment of the apparatus for carrying out the method according to the present invention.

DETAILED DESCRIPTION

Figure 1:
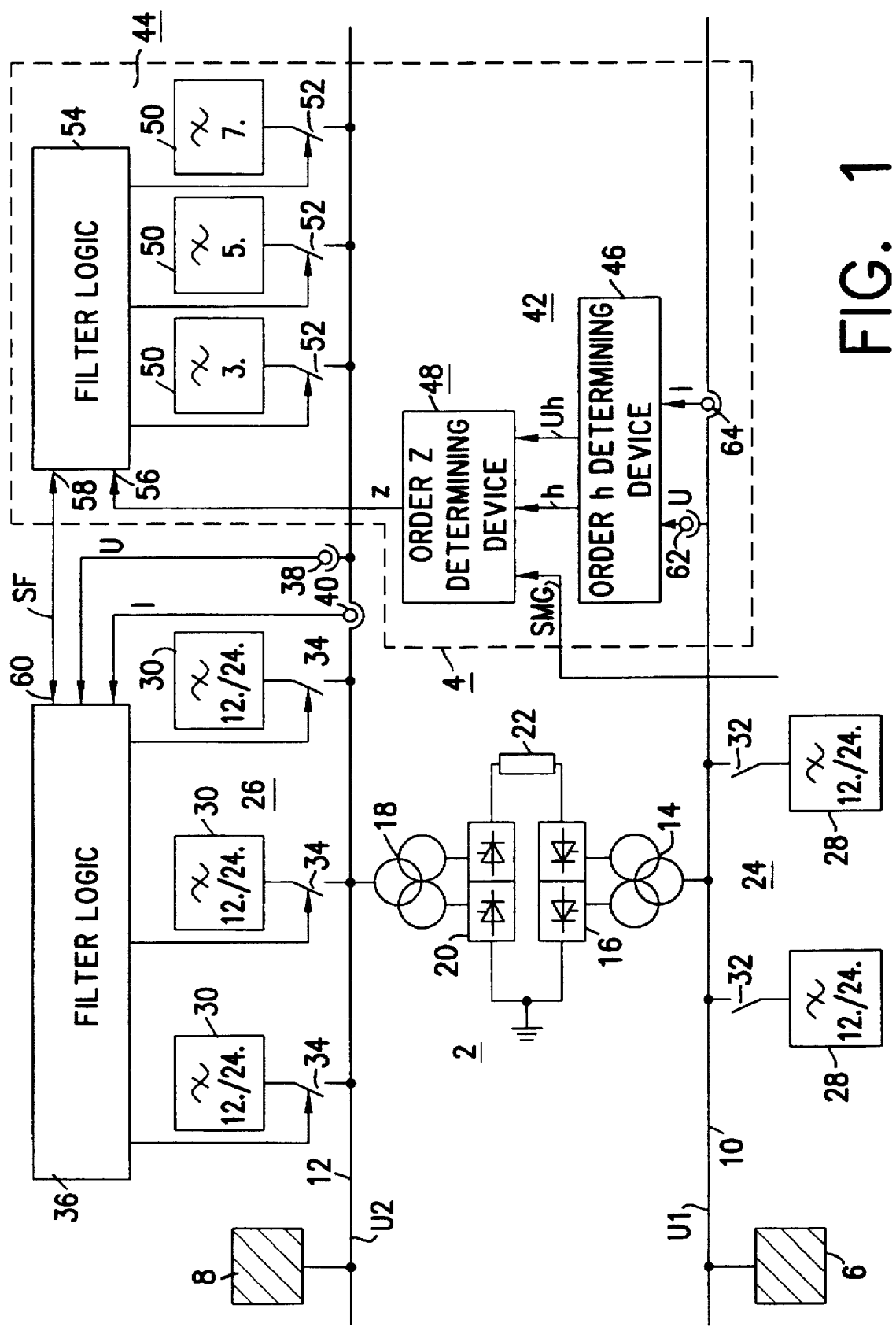
FIG. 1 illustrates an outline circuit diagram of an embodiment of the apparatus according to the present invention, in conjunction with an HVDCT system.

FIG. 1 illustrates a simplified circuit diagram of an HVDCT system 2, also known as an HVDCT short coupling or as a DC grid coupling, having an apparatus 4 for carrying out the method according to the present invention. This HVDCT short coupling 2 couples the two power supply grids 6 and 8. Each of grids 6 and 8 supplies a busbar 10 and 12 with a grid voltage U1 and U2, respectively. The busbar 10 is linked via a converter transformer 14 to a converter 16, and the busbar 12 is likewise linked via a current transformer 18 to a converter 20. The two converters 16 and 20 are electrically conductively connected to one another by a smoothing inductor 22, the converter 16 being operated as a rectifier and the converter 20 as an invertor. The busbars 10 and 12 also respectively have a filter system 24 and 26, whose filter 28 and 30 respectively can be connected by a contactor 32 and 34, respectively to the busbar 10 and 12, respectively. Filter logic 36 of the filter system 26 is also illustrated. Inputs of filter logic 36 are linked to a voltage and current measuring device 38 and 40, whose outputs are in each case connected to a control input of the contactor 34.

The three-phase filters 28 and 30 respectively absorb the harmonics which are produced by the converters 16 and 20 and produce the necessary capacitive reactive volt-amperes to compensate for the converter reactive volt-amperes. Unless any more stringent requirements are placed on the harmonic content in the respective grid 6 or 8, respectively, the three-phase filters 28 and 30 are designed as double-tuned filters with a high-pass impedance. The filter circuits 28 and 30 are connected and disconnected as a function of the reactive voltampere balance in the grid 6 or 8, respectively, and the operating point of the HVDCT 2. This task is carried out by the filter logic 36 whose function [lacuna] is described in the article "Double Tuned Harmonic AC-Filters for HVDC-Converter Stations", printed in the "IEEE/CSEE Joint Conference on High-Voltage Transmission Systems in China", Oct. 17–22, 1987, Beijing, pages 144 to 153. The three-phase filters 28 and 30 are in this case tuned to the 12th and 24th harmonics (characteristically), the respective mean values of the [lacuna] for the lowest characteristic harmonics of twelve-pulse bridge of the two convertors 16 and 20.

The general functional principle of an HVDCT short coupling 2 is based on the fact that, in the case of two grids 6 and 8 which are to be coupled, current and voltages are passed from the grid 6 via the converter transformer 14 to the rectifier station 16 and are there converted into DC voltage or direct current. In the other station 20, which is operated as an invertor, these DC variables are converted back into AC voltage or alternating current. These AC variables are then supplied to the grid 8 via the converter transformer. In order to produce as few harmonics as possible, the two converters 16 and 20 are designed in a 12-pulse manner.

Located in the DC intermediate circuit is the smoothing inductor 22, which has a considerable influence on the operating behavior of the HVDCT 2. It is used for smoothing the direct current and for limiting overcurrent in the event of defects. Thus, a correctly dimensioned smoothing inductor 22 is also linked to better decoupling of the two grids 6 and 8, since mutual grid interactions in steady-state operation are largely prevented by the inductor 22. The control and regulation of the system 2 are not shown, for reasons of clarity, by means of which the system 2 is operated in a reliable and defined operating mode. Programmable-memory controllers are used to implement the control sequences and control functions. The regulator produces all the necessary actions to ensure defined transmission characteristics in steady-state operation and energy transmission in dynamic and transient operating conditions. A digital regulation system is used, individual regulation functions being allocated to the various levels of the hierarchically constructed regulation system in accordance with their priorities and information yields.

Figure 2:
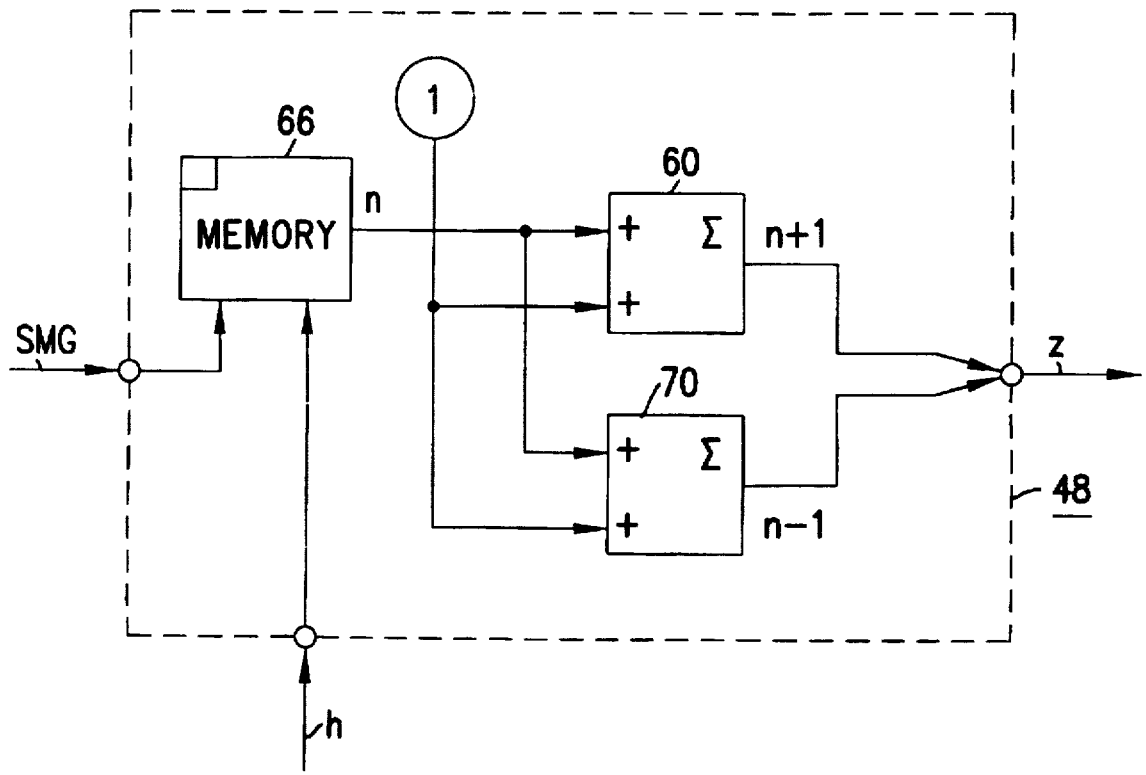
FIG. 2 illustrates a block diagram of a device for determining the orders of non-characteristic harmonics on the second three-phase side of the converter.

The apparatus 4 for carrying out the method according to the present invention contains a measurement and computing device 42 and a compensation system 44. The measurement and computing device 42 includes a device 46 for determining an order h of initial distortion Uh of the voltage U1 of the supplying power supply grid 6, and a device 48 for determining the order z of a lowest non-characteristic harmonic which is produced in the energy supply grid 8 because of an existing non-characteristic harmonic in the grid 6. This device 48 is connected downstream of the device 46. FIG. 2 illustrates a possible schematic layout of the device 48 of FIG. 1 in more detail. The compensation system 44 comprises a plurality of three-phase filter circuits 50 which can be connected on the output side, by means of the contactor 52, to the busbar 12 of the second power supply grid 8, and filter logic 54. In this case, the filters 50 are tuned to the 3rd, 5th and 7th harmonics (non-characteristically). It is also possible to add three-phase filter circuits 50 for the 9th and 11th harmonics. In addition, these filters 50 can also be designed as double-tuned filters with high-pass impedance, as a result of which the number of series-resonant circuits and the number of components (complex construction) are reduced. A first control input 56 of the filter logic 54 is connected to the output of the device 48 for determining the order z of non-characteristic harmonics in the grid 8, and a second control input 58 is connected to a signal output 60 of the filter logic 36 of the filter system 26 of the HVDCT short coupling 2.

The apparatus 4 is linked on the input side, by means of a voltage and/or current measuring device 62 and 64, to the busbar 10 of the first power supply grid 6. In addition, a voltage-symmetry signal SMG is provided by a controller regulator, which are not shown in more detail, of the HVDCT 2 to the device 48 for determining the order z of the non-characteristic harmonics of the grid 8, which harmonics are produced because of existing non-characteristic harmonics in the grid 6.

The method according to the present invention will now be explained in more detail in the following text.

As a result of industrial loads, for example, converter drives and television sets, the power supply grid exhibits elements of low-frequency harmonics, such as the 3rd, 5th, 7th and 9th, for example. These voltage harmonics Uh, also referred to as initial distortion Uh of the voltage U1, have a pronounced response throughout the day, as is known from low-voltage grids. In particular, the sum of the television receiver power supplies causes a higher harmonic level than all the industrial loads. These low-frequency harmonics are harmonics which are not characteristic for a 12-pulse HVDCT short coupling 2 and pass through said HVDCT short coupling 2. That is, these non-characteristic harmonics Uh in turn produce, by modulation, non-characteristic harmonics in the second power supply grid 8. The method according to the present invention is now described based on the knowledge that the order z of the non-characteristic harmonics caused in the second grid 8 are different depending on whether the initial distortion Uh caused in the first grid 6 occurs as a positive-phase-sequence or negative-phase-sequence system.

If, for example, initial distortion Uh occurs as a result of a harmonic of order h=5 in the positive-phase-system of the first power supply grid 6, then the higher adjacent harmonic having the order n=h+1=6 is found as the lowest, non-characteristic harmonic on the DC side of the HVDCT short coupling 2. If, in contrast, this initial distortion Uh occurs in the negative-phase-sequence system of the first power supply grid 6, then the lower adjacent harmonic having the order n=h−1 =4 is found on the DC side as the lowest harmonic. The harmonic voltage Unh, which is produced by the grid initial distortion Uh, in the DC circuit will cause an additional harmonic current element Idh whose amplitude depends on the harmonic voltage Unh, the inductance L of the inductor 22, the order n of the non-characteristic harmonics on the DC side and the frequency ω. This harmonic, which is superimposed on the direct current, in turn produces non-characteristic harmonic currents Ih on the second three-phase side of the HVDCT short coupling 2 of order z=n+/−1. That is, a non-characteristic harmonic of order h=5 in the first power supply grid 6 produces non-characteristic harmonics of orders z=5 and z=7 on the second grid side.

If these non-characteristic harmonics were not absorbed by three-phase filter circuits 50, then these non-characteristic harmonics, which are below the lowest tuning frequency of the filters 30 of the HVDCT 2, would form a tuned circuit with the grid impedance, since the filters 30 act capacitively for these harmonics. If this tuned circuit has a parallel resonance point in the region of these non-characteristic harmonics, it will be excited by the non-characteristic harmonics and unexpectedly high voltage harmonics can occur in the grid 8. These voltage harmonics would considerably reduce the energy quality of the grid 8.

In accordance with the method and apparatus according to the present invention, the order and possibly also the amplitude of the initial distortion Uh of the voltage U1 of the grid 6 are initially determined by means of the device 46. A known harmonic measurement unit ("Elektrie", Berlin 46 (1992) 3, pages 114 to 121) can be used as the device 46. The downstream device 48 initially determines the order n of the non-characteristic harmonics on the DC side of the HVDCT 2 as a function of the determined order h and of a voltage-symmetry signal SMG which is provided. The device 48 then determines the order z of the non-characteristic harmonics on the second three-phase side of the HVDCT 2. The filter logic 54 produces control signals for the contactor 52 corresponding to these determined orders z=n+/−1, so that three-phase filter circuits are connected to the grid 8 corresponding to the orders 7, which three-phase filter circuits absorb the harmonic currents Ih having the orders z. Since the filters 50 are in each case designed for low reactive volt-amperes, a precautionary measure is installed. In this case, an enable signal SF is generated by the filter logic 36 of the filter system 26 as soon as one of its filters 30 is connected to the grid 8.

By way of example, FIG. 2 illustrates an embodiment of the device 48 for determining the order z of the non-characteristic harmonics in the grid 8. On the input side, device 48 has a memory 66 which is in each case connected on the output side to a positive input of an adder 68 and 70. On the input side, the order h of the non-characteristic harmonics of the grid 6 and the voltage-symmetry signal SMG are supplied to the memory 66. The voltage-symmetry signal SMG indicates whether the initial distortion Uh of the voltage U1 in the grid 6 is occurring in the positive-phase-sequence or negative-phase-sequence system. A table of harmonic voltages, with the orders n and the associated amplitudes, is stored in the memory 66, for each voltage system. After a table has been selected in response to the voltage-symmetry signal SMG, the associated order n of the non-characteristic harmonics on the DC side of the HVDCT 2 is read out by means of the order h, and is in each case supplied to the positive input of the adders 68 and 70. The constant "1" is applied to the second input of the adder 68 (positive input) and of the adder 70 (negative input). An order z=n+1 and z=n−1 of the non-characteristic harmonics of the grid 8 are in each case produced at the outputs of the adders 68 and 70, having been produced on the basis of a non-characteristic harmonic in the grid 6.

A non-characteristic harmonic of order h=5 in the positive-phasesequence system of the first grid 6 generates non-characteristic harmonics of order z=5 and z=7 in the second grid 8. A non-characteristic harmonic of order h=5 in the negative-phase-sequence system of the first grid 6 generates non-characteristic harmonics of orders z=3 and z=5 in the second grid 8.

According to the method and apparatus according to the present invention it is possible in each case to determine each non-characteristic harmonic in the first grid 6 on the basis of the order h and the amplitude of the initial distortion Uh, and to determine the orders z of the generated noncharacteristic harmonics of the second grid 8, so that corresponding three-phase filter circuits 50 can be connected to the second grid in accordance with these orders z, which three-phase filter circuits 50 absorb the harmonic currents Ih. The energy quality of the second grid 8 is in consequence improved. The method and apparatus of the present invention can considerably improve the energy quality, particularly in the case of grids which are not rigid.

We claim:

1. A method for determining an order of non-characteristic harmonic currents of a second power supply grid which is coupled to a first power supply grid by a short coupling including a high-voltage DC transmission system, and for compensating for the non-characteristic harmonic currents, which are produced as a result of distortion of a supply voltage, which distortion exists in the first power supply grid because of a low-frequency harmonic and which distortion passes through the short coupling, comprising steps of:

a) determining an order of initial distortion of the voltage of the first power supply grid based on at least one of a voltage and a current measurement;
   b) determining an order of a lowest non-characteristic harmonic on a DC side of the system as a function of a determined order of a provided voltage-symmetry signal;
   c) determining an order of a lowest non-characteristic harmonic on the second three-phase side of the system as a function of the determined order of the non-characteristic harmonic on the DC side of the short coupling and of the provided voltage-symmetry signal; and
   d) activating at least a part of a compensation system on the basis of the determined orders of non-characteristic harmonic currents in the second power supply grid.

2. A method according to claim 1, wherein the compensation system is supplied with an enable signal for the non-characteristic harmonic currents.

3. A method according to claim 1, wherein an order of a lowest non-characteristic harmonic on the DC side of the system is calculated according to n=h+1 when the caused grid distortion is in the positive-phase-sequence system, and according to n=h−1 when the caused grid distortion is in the negative-phase-sequence system, where h is the order of grid distortion.

4. A method according to claim 1, wherein an order of a lowest non-characteristic harmonic on the second three-phase side of the system is calculated according to z=n+1, where n is the order of a non-characteristic harmonic on the DC side of the short coupling.

5. An apparatus for determining an order of non-characteristic harmonic currents of a second power supply grid which is coupled to a first power supply grid, where the first and second power supply grids are connected to one another by a short coupling including a high-voltage DC transmission system, the first power supply grid having a voltage with an initial distortion caused by a low-frequency harmonic, which distortion passes through the short coupling, the apparatus comprising:

a first device determining an order of the initial distortion of the voltage of the first power supply grid, to which first device at least one of a voltage and a current measurement is supplied;
   a second device determining an order of a lowest non-characteristic harmonic on a second three-phase side of the system as a function of the determined magnitude and the determined order of the initial distortion, of a voltage-symmetry signal and of an order, which is determined in the meantime, of a lowest non-characteristic harmonic on the DC side of the system, said second device being connected downstream of the first device determining the initial distortion; and
   a compensation system compensating the non-characteristic harmonic currents in the second power supply grid, a control of the compensation system being connected to the output of the second device determining the order of a lowest non-characteristic harmonic, the outputs of the compensation system being connectable to the second power supply grid.

6. An apparatus according to claim 5, further comprising an enable signal supplied from filter logic in a HVDCT system to a second control input of the compensation system for non-characteristic harmonic currents.

7. An apparatus according to claim 5, wherein the first device determining the magnitude and order of the initial distortion comprises a harmonic measuring unit.

8. An apparatus according to claim 5, wherein the second device determining the order of a non-characteristic harmonic comprises a memory with downstream-connected logic.

9. An apparatus according to claim 5, wherein the compensation system for the non-characteristic harmonic currents includes a plurality of filters having different low-frequency orders.

* * * * *